United States Patent
Blake (10) Patent No.: US 9,282,819 B2
(45) Date of Patent: Mar. 15, 2016

(54) PORTABLE ANIMAL TRAINING TABLE INTERLOCKABLE WITH LIKE TABLES

(71) Applicant: Blue-9, LLC, Maquoketa, IA (US)

(72) Inventor: David R. Blake, Maquoketa, IA (US)

(73) Assignee: Blue-9, LLC, Maquoketa, IA (US)

( * ) Notice: Subject to any disclaimer, the term of this patent is extended or adjusted under 35 U.S.C. 154(b) by 0 days.

(21) Appl. No.: 14/335,440

(22) Filed: Jul. 18, 2014

(65) Prior Publication Data

US 2016/0015177 A1    Jan. 21, 2016

(51) Int. Cl.
| | | |
|---|---|---|
| *A47B 57/00* | (2006.01) |
| *A47B 87/00* | (2006.01) |
| *A47B 3/06* | (2006.01) |
| *A47B 13/00* | (2006.01) |
| *A47B 87/02* | (2006.01) |
| *A47B 3/00* | (2006.01) |

(52) U.S. Cl.
CPC ............... *A47B 87/002* (2013.01); *A47B 3/06* (2013.01); *A47B 13/003* (2013.01); *A47B 87/02* (2013.01); *A47B 2003/008* (2013.01)

(58) Field of Classification Search
CPC ............... A47B 87/02; A47B 87/0207; A47B 87/0215; A47B 87/0246; A47B 87/0276; A47B 7/02
USPC ........ 108/42, 23, 64, 53.1, 91, 92, 156, 157.1
See application file for complete search history.

(56) References Cited

U.S. PATENT DOCUMENTS

| | | | |
|---|---|---|---|
| 3,687,092 A * | 8/1972 | Manning ....................... 108/156 |
| 4,011,821 A | 3/1977 | Neal |
| 5,076,534 A | 12/1991 | Adam |
| 5,269,231 A * | 12/1993 | Johnson ........................... 108/23 |
| 5,400,719 A | 3/1995 | Santapa et al. |
| D366,190 S * | 1/1996 | Vance et al. .................... D7/708 |
| 5,556,181 A * | 9/1996 | Bertrand .......................... 108/25 |
| 5,860,369 A * | 1/1999 | John et al. .................. 108/57.26 |
| 5,876,262 A * | 3/1999 | Kelly et al. ...................... 108/23 |
| 6,234,087 B1 * | 5/2001 | Brown .......................... 108/56.1 |
| 6,253,688 B1 | 7/2001 | Lor |
| 6,282,084 B1 | 8/2001 | Goerdt et al. |
| 6,662,732 B2 * | 12/2003 | Birsel et al. ...................... 108/25 |
| 6,976,434 B2 * | 12/2005 | Roig et al. ....................... 108/25 |

(Continued)

FOREIGN PATENT DOCUMENTS

WO    WO 2004/078269 A2    2/2004

OTHER PUBLICATIONS

Dog Agility USA Adjustable Gripper Top Pause Table 35"×35", downloaded from www.dogagilityusa.com/Pause_Tables-Adjustable_Gripper_Top_Pause_Table_35"35.html Apr. 8, 2014.

*Primary Examiner* — Jose V Chen
(74) *Attorney, Agent, or Firm* — Woodard, Emhardt, Moriarty, McNett & Henry LLP (57) ABSTRACT

A table configured to aid in the training of animals. The table can include legs that can be in multiple positions, one of which allows the legs to be stored. Multiple of such tables and/or table tops can be stacked atop each other to alter the height of the table top and still be laterally stable between the tables and/or table tops. The tables can also include projections and recesses that enable lateral interlocking of the tables to form a larger table top surface. Each table can be designed to be lightweight, portable, rigid, and stable for use as an animal training aid.

32 Claims, 7 Drawing Sheets

(56) References Cited

U.S. PATENT DOCUMENTS

| | | |
|---|---|---|
| D522,284 S * | 6/2006 | Shapiro et al. ............... D6/511 |
| 8,118,375 B2 | 2/2012 | Berthiaume et al. |
| 8,146,517 B1 * | 4/2012 | Masser et al. ................. 108/64 |
| 8,176,857 B2 * | 5/2012 | Ochs ............................. 108/64 |
| 8,186,282 B1 * | 5/2012 | Sinchok et al. .......... 108/147.12 |
| 8,215,245 B2 * | 7/2012 | Morrison et al. ............... 108/91 |
| D665,594 S * | 8/2012 | Goldszer ..................... D6/406.3 |
| 8,316,781 B1 * | 11/2012 | Majors ........................... 108/64 |
| 8,327,775 B2 * | 12/2012 | Fox Harris ................. 108/53.3 |
| 8,919,263 B2 * | 12/2014 | Jeong ............................. 108/64 |
| 2012/0031311 A1 | 2/2012 | Jong |
| 2012/0271350 A1 | 10/2012 | Palmer |

* cited by examiner

PORTABLE ANIMAL TRAINING TABLE INTERLOCKABLE WITH LIKE TABLES

BACKGROUND

The present invention pertains to a novel table suitable to be used as an animal training aid. Tables, platforms, and pedestals are well known to be effective animal training aids. Such tables are commonplace in dog obstacle courses and have also commonly been used by lion tamers. The tables are generally used to teach the animal to stay in a confined area which demands a fair amount of focus on the part of the animal. The table provides a natural boundary defining an area in which the animal is to be trained to be confined within.

The most common use for such a platform today is for training dogs. However, it should be evident from this disclosure that such a platform can be used for a variety of purposes. These purposes can include training animals for obstacle courses, hunting, police work, border inspections, or for everyday activity such as bringing a dog to a dog park.

Although such platforms have been in use for hundreds of years, there are few commercially available examples. Tables that are available are generally used to train dogs for regulated obstacle courses. These tables are regulated to a set, relatively large size and are relatively heavy. They are therefore difficult to transport, especially by hand. Additionally, most of these tables are configured to one set height. The few that are adjustable in height have a limited range of adjustability. Therefore, these tables are rarely used outside the specific purpose of training dogs for regulated obstacle courses. Thus, there is a need for improvement in this field.

SUMMARY

Although tables have been used for many years as animal training aids, they have not found common, widespread use due to several limitations in their design. The disclosed table includes several novel features that aid in the use of the table for day-to-day and professional activities. Many of these features are enabled by the design of the table which allows it to be light, resilient, stable, and still maintain sufficient load bearing strength. Concurrently, the disclosed table can be manufactured from a polymer and may include one or more hollow cavities. Additionally, the legs can be located in position to form a table top with legs extending distally from the bottom of the table top or they can be in a stored position adjacent the table top. It is preferred for the legs to be stored parallel to the table top and/or within the table top when in the stored position. The manufacturing process and design of the table along with the repositionable legs can enable the table to be hand transportable by a person (the table being relatively light and compact) while still having sufficient strength to support the weight of an animal placed atop the table.

These features enable the table to be used in a home setting to train the animal and then the same table can be readily transported to an area of interest. This area of interest can be a hunting location, a dog park, an obstacle course, an airport, a border station, or any other location in which is desirable for the animal to be confined to the top of the table. The easily transportable table top with the legs stored within it could also be placed directly on the ground in order to confine the animal to the table top. This could be beneficial in many locations including, but not limited to, classrooms, places of work, places of worship, and shopping outlets.

An additional novel feature of the table is the inclusion of mating locations on the top of the table. These mating locations correspond to structures on the bottom of the table legs and the table tops. The mating locations and corresponding structures are designed to inhibit lateral movement between tables and/or table tops when the mating locations contact corresponding structures on other like tables and/or table tops. It should be obvious from the present disclosure that this feature enables multiple tables with legs in position and/or table tops without legs in position to be stacked one upon each other while maintaining lateral stability between the tables and/or table tops in order to inhibit the stack from tipping over, or having portions laterally sliding, or otherwise becoming unstable when used as an animal training aid.

These features enable the height of the stack to be gradually increased during training, increasing the effectiveness and speed at which the animal can be trained. The height can also be adjusted depending on the circumstances surrounding the use of the table, especially when in an area of interest. For example, the stack height may be higher in a hunting location where the ground is soft and the table may partially sink into the ground. Conversely, a table top can be placed directly adjacent to the ground to more widely distribute the load transferred from a table and/or an animal placed upon the table top. The adjustable height can also be beneficial if the invention is used in a regulated obstacle course requiring a set height.

Further novel feature of the table allows for multiple tables to be interlocked laterally to form a singular larger top surface. This feature allows an animal to be trained to be confined to an increasingly smaller area as the animal becomes more proficient. Additionally, this feature allows the animal to be in several lying, seated, or other positions when atop the table depending on the circumstances. The size of the top surface can be also adapted to the size of the animal which the tables are being used to train or for the purpose that the table is to serve. It should be obvious from this disclosure that these features, especially when used concurrently, form an extremely adaptable animal training aid able to fit a variety of situations and animals. The lateral and vertical interlocking features allow multiple tables to form several varying heights, top surface areas, and/or "stair step" configurations. In addition, the portability and load bearing aspects of the invention enable its widespread and common use in a variety of locations include the home and the workplace in a manner that was previously not feasible.

Further forms, objects, features, aspects, benefits, advantages, and embodiments of the present invention will become apparent from a detailed description and drawings provided herewith.

DESCRIPTION OF THE SELECTED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Figure 1:
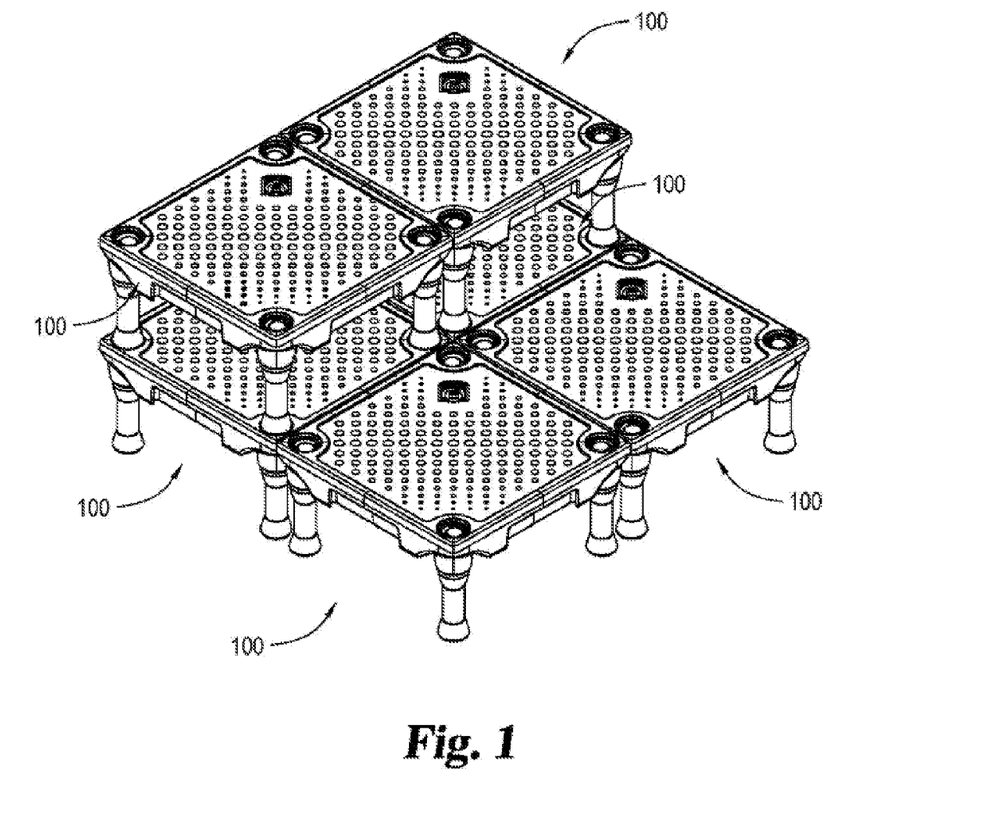
FIG. 1 is an isometric view of four identical example tables joined laterally and two identical example tables joined laterally placed atop the four example tables.

FIG. 1 illustrates one of many various arrangements in which six identical example tables 100 can be arranged. The features that enable these versatile arrangements will become evident from the following disclosure. In FIG. 1, four of the tables 100 are joined laterally to form one larger top surface area. Atop these four tables, are two additional tables 100 each identical to the four on the bottom that are joined together do form a second larger top surface area. The two top tables have their legs in position such that the legs interlock with corresponding mating locations on the four bottom tables which inhibit lateral movement between the two sets of tables. This arrangement forms a "stair step."

Figure 2:
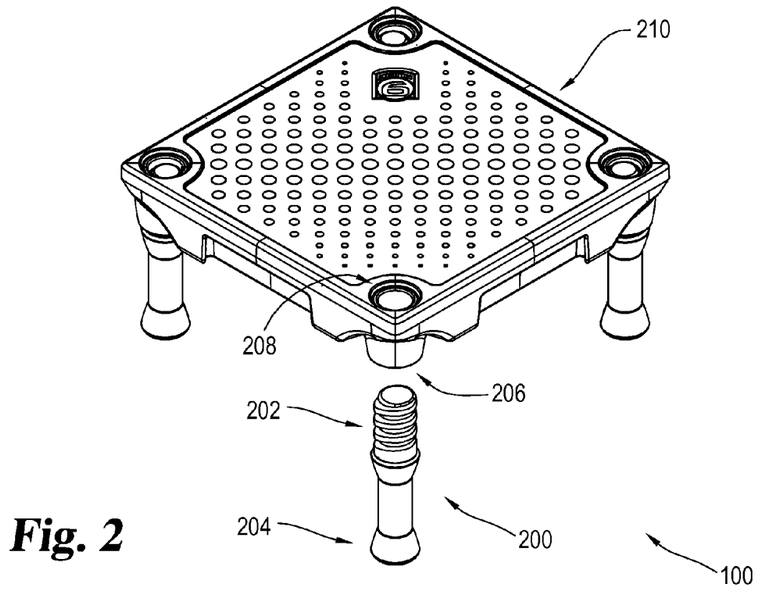
FIG. 2 is an isometric view of an example table of FIG. 1 with one leg detached from the table top.

FIG. 2 illustrates a one of the example tables 100 in FIG. 1. It includes a table top 210 and multiple legs 200. Each of the four legs 200 has an attachment end 202 and a base end 204. The attachment end 202 specifies the end of the leg 200 that is proximal to the table top 210 when the legs are in position. Conversely, the base end 204 specifies the end of the leg that is distal from the table top 210 when the legs are in position for use. The table top includes mating locations 208 and attachment locations 206. The mating locations 208 in this example can be indentations. The attachment locations 206 and the base end 204 of the leg 200 are each configured to interlock with the mating locations 208 of another table top (not shown) in a manner shown in FIGS. 3 and 4.

Figure 3:
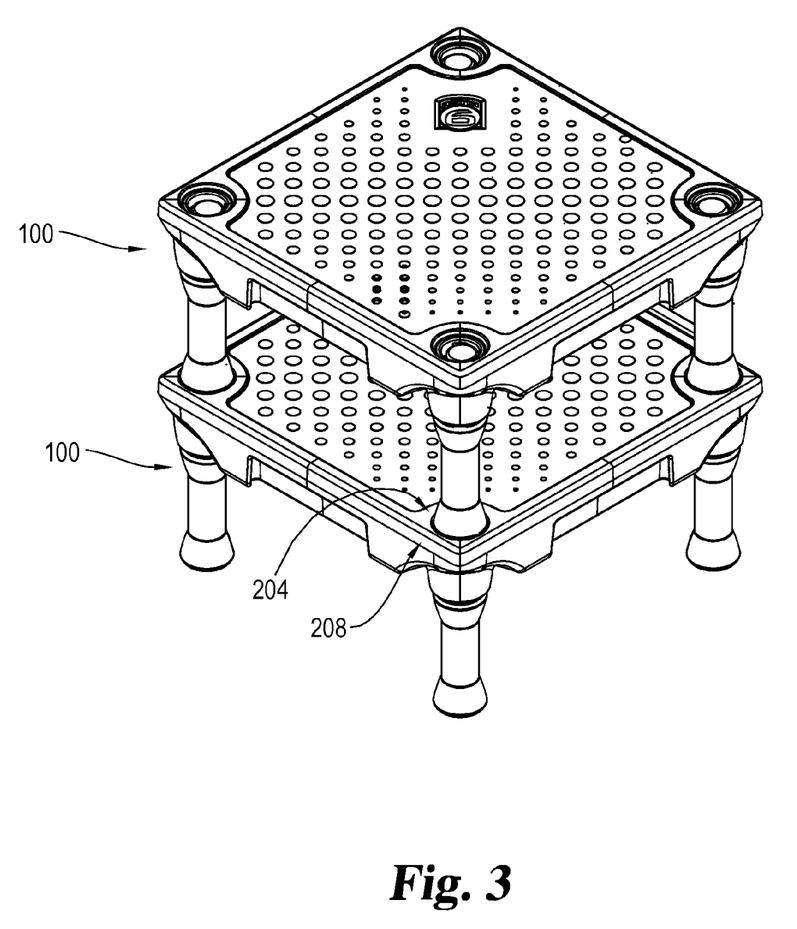
FIG. 3 is an isometric view of an example table of FIG. 1 with legs in position placed atop a second identical example table.

FIG. 3 illustrates two tables 100 stacked one atop the other. Both tables have their legs 200 in position for use. In this example, the base ends 204 of the legs 200 can have protrusions corresponding to the indentations of the mating locations 208 such that when the protrusions and indentation connect, the tables interlock such that they are laterally stable.

Figure 4:
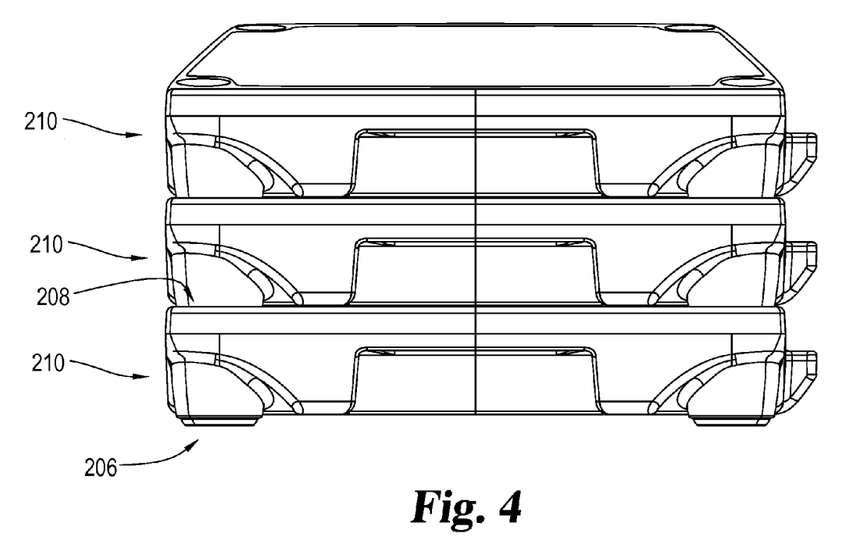
FIG. 4 is a side view of three identical example table tops of the type shown in FIG. 1 (without legs attached) stacked atop one another.

FIG. 4 illustrates three table tops 210 stacked atop each other. Each of the attachment locations 206 of the top two table tops 210 can have protrusions corresponding to the recesses of the mating locations 208 such that when the protrusions and recesses connect, the tables top 210 interlock such that they are laterally stable.

As should be evident from the disclosure, several variations and combinations of indentations and protrusions can be used to inhibit lateral movement between the table tops and/or tables without deviating from the invention. Each mating location can be an indentation, a protrusion, or a combination of any number of indentations or protrusions with corresponding mating structures. The lateral inhibition can also be aided using a magnetic force or the tables could include an active locking mechanism containing latching parts that move relative to the table top.

As should be evident from the disclosure, the flexibility in configuring the heights of tables 100 and table tops 210 is beneficial for training animals. The initial training can begin utilizing a single table top. As the animal becomes more proficient, multiple table tops can be stacked and then multiple combinations of tables with legs in position and table tops can be stacked to gradually increase the height of the system of tables and table tops. In this manner, the animal gradually becomes more proficient at staying upon an increasingly high platform, increasing the speed at which the animal can be trained as well as aiding the training of animals that may be hesitant to reach a higher platform. A large number of stable heights can thus be obtained by the selection of appropriate combinations of tables and table tops.

Figure 5:
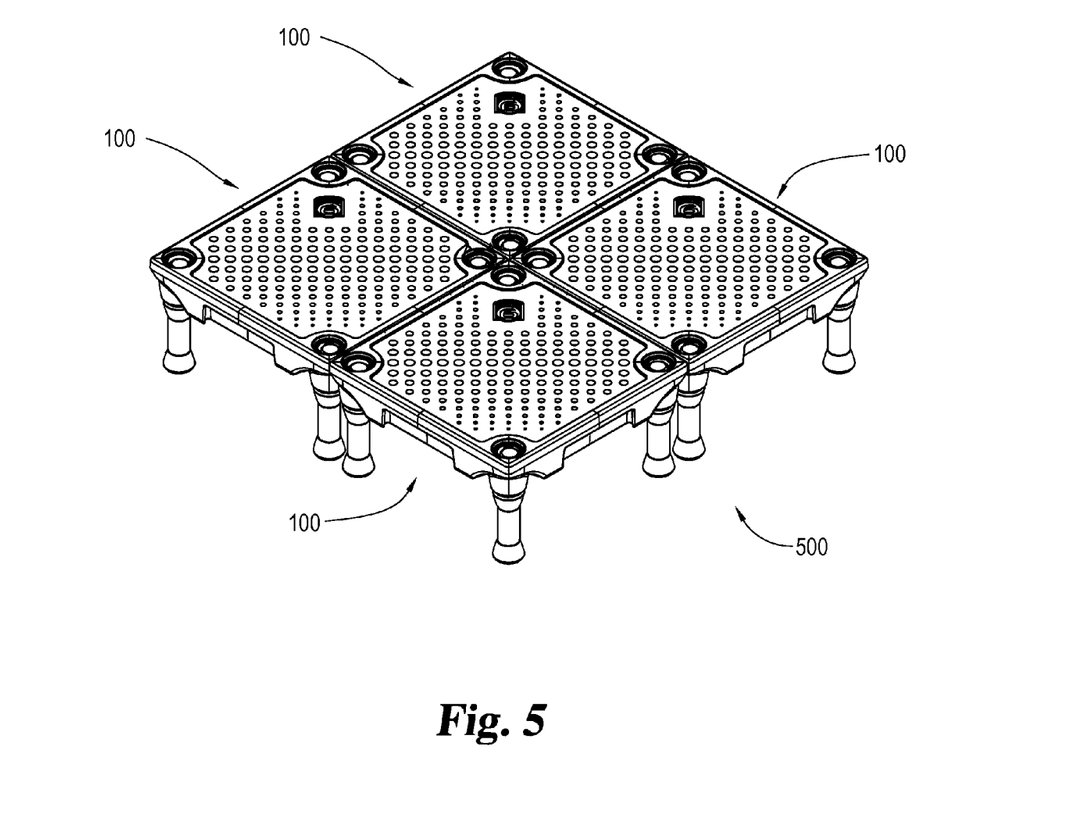
FIG. 5 is an isometric view of four identical example tables of FIG. 1 joined laterally to form one larger top platform.
Figure 6:
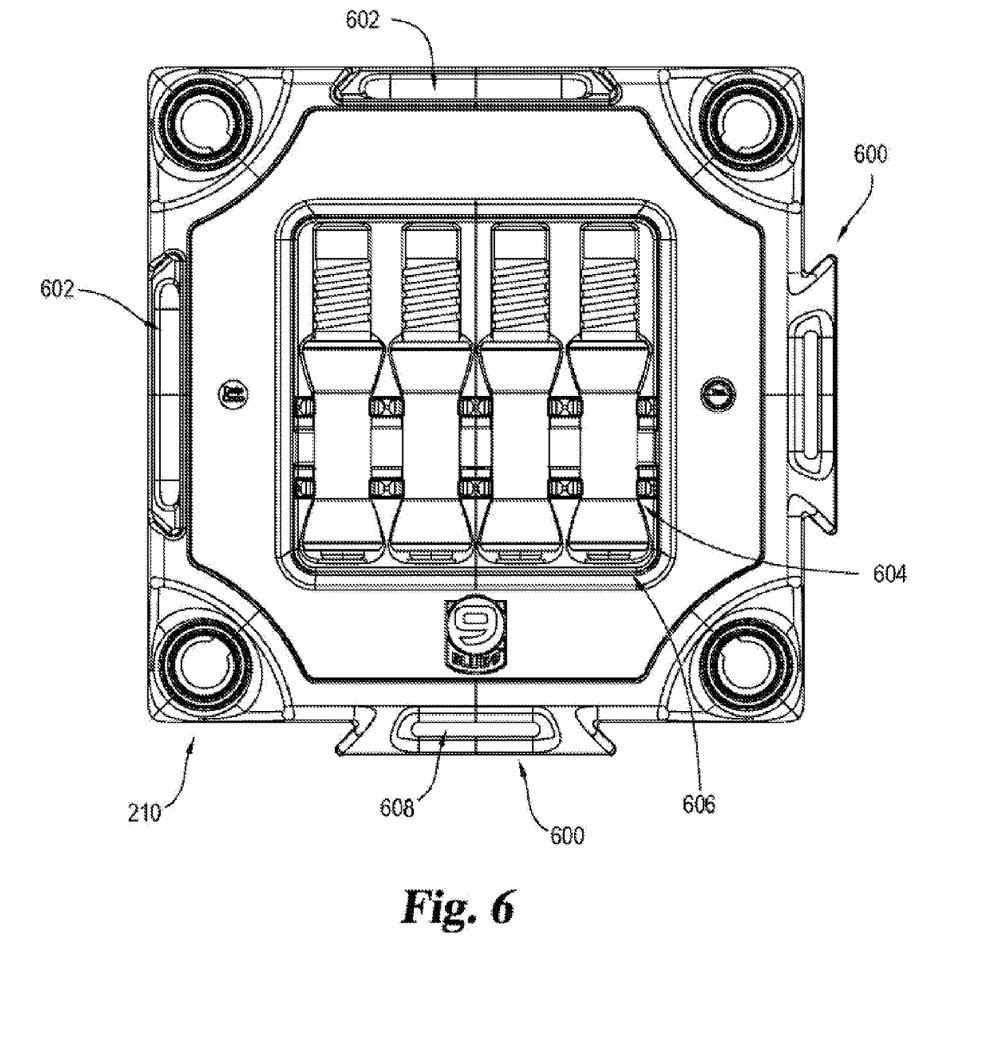
FIG. 6 is a bottom view of an example table top of FIG. 1 with legs removed and stored within the table top.

FIG. 5 illustrates another aspect of the table 100, namely that they can be joined laterally to form a table platform 500 with a larger top surface than an individual table 100. FIG. 6 illustrates a bottom view of the table top 210. The table top can include projections 600 extending from two of its sides with corresponding recesses 602 on the other two sides. A projection 600 combined a recess 602 form a dovetail joint, with the upper surface of the table top limit the upward movement of projection 600 in recess 602. While a dovetail joint is preferred, alternative interlocking shapes can be used instead. The projections 600 can be interlocked into the recess 602 of an identical adjacent table top. The locations of these projections 600 and recesses 602 being on adjacent sides instead of opposite sides allows four of the tables 100 to be joined into the two-by-two array illustrated in FIG. 5 with the top of table top 210 extending over the recesses 602, as is preferred. Because the table tops are substantially square, with their upper surfaces covering the recesses 602, a combined array is not left with openings large enough for a dog's paw to get caught in. More specifically, in a two-by-two array the space at the central junction of all four tables is too small to allow the end of a one-half inch diameter dowel rod to be inserted from above the table to below the top of the table.

As should be evident from the disclosure, several designs of projections 600 and recesses 602 can be used without deviating from the invention. In this example, the projections 600 increase in width as they extend distally from the table top 210. It should be understood that a "T", ball, dowel, diamond, or other projections can be used with a corresponding recess 602 to interlock the tables together laterally. Alternatively for example, two adjacent sides could have two projections on each side, with the other two sides each having two corresponding recesses. Preferably, the projections 600 include an opening 608 suitable that provides a slot for attachment of a carrying strap (not shown) or for passing an animal leash (not shown) through to enable the leash to be tied to the platform.

The ability to join the table tops laterally is beneficial for animal training The lateral joining allows top surfaces of multiple sizes to be created using a plurality of tables 100. Therefore, a platform suitable for larger animals can be created from standardized smaller tables that themselves may be ideal for smaller animals. Additionally, the size of the top surface can be dynamically altered during the training regime. The platform could be shrunk as the animal becomes more proficient at staying within its boundaries and could therefore be taught to lay on a platform and then sit. Conversely, the platform could be enlarged during training FIG. 6 also illustrates a feature of the table 100 wherein the legs 200 can be stored substantially within the table top 210 when not in position. In this example, the legs are removable and clamps 604 are used to store the legs 200 within a recess 606. Preferably clamps 604 are formed as part of the hollow unitary table top 210 when it is made with polyethylene using rotational molding. As illustrated, the hollow legs, which are preferably blow molded polyethylene, can be stored substantially parallel to each other. Preferably, the legs 200 are removable, but alternatively legs 200 can fold or extend from the table top 210, or otherwise remain attached to the table top while being moveable between different positions.

Figure 7:
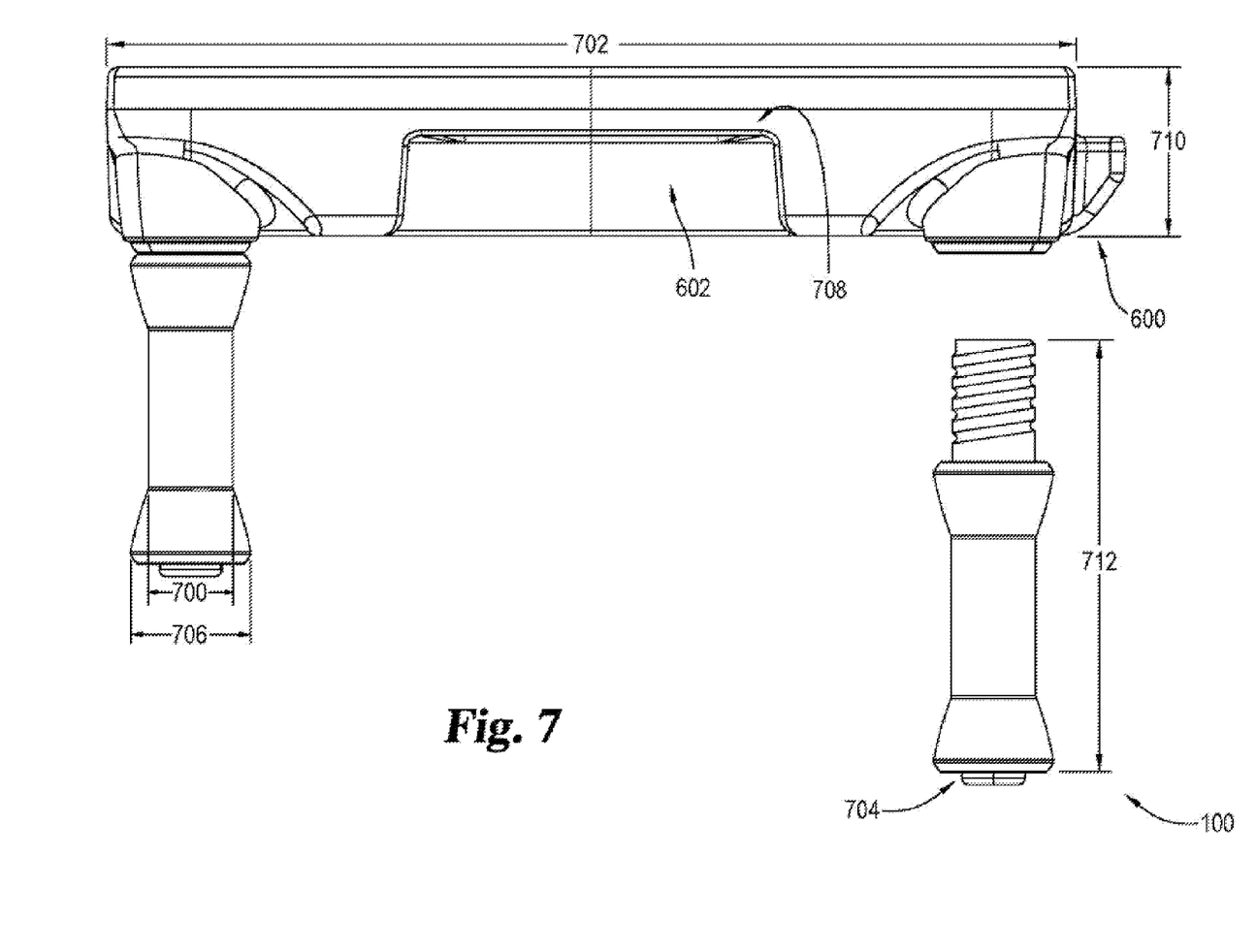
FIG. 7 is a side view of an example table of FIG. 1 with a leg detached to illustrate dimensional variables.

FIG. 7 illustrates a side view of the table 100. Several dimensions and features of the table are designated that aid in the portability and stability of the table 100. The thickness of the preferably hollow legs can aid in its stability and, depending on the manufacturing method, its low mass and resiliency. The thickness can be defined as the cross sectional area of the leg parallel to the table top when the leg is in position for use. If the cross sectional area is circular, the area of each leg is given by π times the square of the radius, wherein the radius is half of the diameter 700. If the top of the table top is a square, its area can be found by multiplying together the length 702 of two of its sides. It is preferred that the sum of the minimum cross sectional areas of each leg to be greater than two percent of the area of the top of the table top to aid in stability, giving the legs a relatively stout form. It is more preferred for the table legs to have a cross sectional area (calculated from the diameter 706 of the leg, if circular) that is greater than four percent of the area of the top of the table top. This feature gives the legs thicker areas that can distribute the forces transferred between the legs 200 and the ground and/or table top 210 when the table is used to support weight placed atop it and the legs are in position.

To aid in the stability of the platform, it is also preferred for the length 712 of the legs of the platform to be greater than two and less than four times the length of the greatest thickness 710 of the table top. This lowers the center of gravity of the table when the legs are in position and therefore makes the table less likely to tip over when an animal jumps or otherwise removes itself from the top of the table.

It is also preferred for the length 712 of the leg 200 to be less than the largest dimension of the table top 210 to said in storing the leg 200 when it is not in position so that the legs 200 must not necessarily extend beyond the dimensions of the table top 210 when stored parallel to the table top 210. As shown in FIGS. 7, 6, and 1, the length 712 of the legs 200 is not greater than about half the width 702 of the table top 210.

The table top preferably also contains an extension 708 over the recess 602. In this manner, the platform created from joining the table tops 210 together can be more continuous than if it were lacking this extension 708, as shown in FIG. 5. Optionally, elastomeric components 704 can be attached to the base end 204 of each leg to increase the friction between the base end 204 and the ground when the table is subjected to a lateral force. An elastomeric coating (not separately shown) can also be used on the table top 210 to increase comfort and lessen the risk that an animal might slip on the table top 210 surface and to help prevent possible injuries to the animal or operator. As a still further option, component 704 may be eliminated, especially if the plastic selected for use for the legs is more rubber-like. Various patterns can be molded onto the table top 210, such as a coin pattern, a diamond patterns, a knurled pattern or the like, to also minimize the risk of slipping.

The preferred hollow cavities within the table top 210 and table legs 200 aid in the table's low mass, rigidity, and resiliency. Additionally, these cavities can allow the table to be built such that it floats after being submerged in water. This can aid in use, especially by hunters near lakes and streams. As a less preferred alternative, the various parts of the table can contain foam, such as closed cell polystyrene foam (not shown) to provide relatively light weight and additional strength.

While the preferred fully featured form of the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. For one example, even though the examples provided are in the context of animal training, the inventions may also be used for other purposes unrelated to animal training Use of these tables by children would fall within the scope of the claims as set forth below.

The invention claimed is:

1. A table suitable for stacking whether or not its legs are in position, comprising:
   a. several legs each having a base end and an attachment end;
   b. a table top having several mating locations on its top and several corresponding mating locations on its bottom;
   c. said table top also having several attachment locations each allowing at least one orientation for the attachment end of one of said legs to position it with its base end mating with corresponding mating locations on the top of an identical table top, who when all of said several legs are so positioned, an identical table stacked is laterally stable as referenced to said table top; and
   d. said table top is also adapted so that two of such tops, without legs in position, would interlock to substantially inhibit lateral movement between the two tops when the top of one is next to the bottom of another so as to prevent horizontal movement between them when interlocked.

2. The table of claim 1 wherein each of the several legs are identical to one another.

3. The table of claim 1 wherein the mating locations on the top of the table top all have indentations and the mating locations on the bottom of the table top and on the base ends of the legs all have corresponding protrusions.

4. The table of claim 1 where said legs are removable.

5. The table of claim 4 where said legs are storable substantially within the table top.

6. A four-sided table suitable for use as an animal training aid with protruding members on adjacent sides to facilitate interlocking with three other identical tables when forming a 2-by-2 array, comprising:
   a four-sided table, having a table top and four legs each capable of two different positions with respect to said table top; and
   a projection extending from each of two adjacent sides of said table top, and a corresponding recess in each of the two other sides, each projection shaped to lockingly fit a recess like the recess on the opposite side of said table; and
   with the top of the table top extending over the recesses and the opening for the recesses extending to the bottom of the table top, whereby a projection fitting in the recess can only be removed by lowering it, and its upward motion is blocked by the table top.

7. The table of claim 6 in which the table top has sufficiently square corners that when four are positioned in a 2-by-2 array, any space at the central junction of all four tables is too small to allow the end of a one half inch diameter dowel rod to be inserted from above the table to below the top of the table.

8. The table of claim 6 in which the projection includes an opening suitable for passing a strap through.

9. A portable, stable table with storable legs, comprising:
   a. a table top; and
   b. at least three blow-molded legs each having a base end and an attachment end;
   c. said table top also having several attachment locations each allowing at least one first orientation for the attachment end of one of said legs to position it with its base end extending away from said table top a distance less than the largest dimension of the table top;
   d. said legs being storable in a different orientation from the first orientation that is substantially parallel with the table top;
   e. said legs when in the first position together do not have any cross sectional areas parallel to the table top that is less than two percent of the area of the top of the table top; and
   f. wherein the length of said legs is not greater than about half the width of the table top.

10. The table of claim 9 wherein the table comprises four legs.

11. The table of claim 9 wherein the number said attachment locations is equal to the number of said legs.

12. The table of claim 9 wherein the bottom of said table top has corners and the number of said attachment locations is equal to the number of corners of said table top.

13. The table of claim 12 wherein said attachment locations are proximal to the corners of the bottom face of the table top.

14. The table of claim 13 wherein said legs are storable being positioned approximately parallel to one another.

15. The table of claim 9 wherein said table top is manufactured from a molded polymer.

16. The table of claim 15 wherein said table top and legs are configured with each having hollow cavities that are engulfed by the polymer.

17. The table of claim 15 wherein said table top is configured with one large cavity that is engulfed by the polymer.

18. The table of claim 17 in which the polymer is polyethylene.

19. The table of one of claim 9 or claim 15 wherein said legs are manufactured from a molded polymer.

20. The table of claim 9 wherein said table top and legs are each hollow molded plastic that floats on water even after being momentarily fully submerged in said water in any orientation.

21. The table of claim 9 wherein said table top is unitary.

22. The table of claim 9 wherein an elastomeric component is attached to the base end of each of said legs to impede lateral movement of the table when the legs are in the first orientation and the table is placed upon a surface with the legs supporting the table top.

23. The table of claim 9 where said legs are removable.

24. The table of claim 23 wherein said legs are attached to the table top when in the stored orientation.

25. The table of claim 23 wherein each of said legs is unitary.

26. The table of claim 9 wherein said legs when in the first position together have a cross section area parallel to the table top greater than four percent of the area of the top of said table top.

27. The table of claim 9 wherein said legs are more than two and less than four times in length compared to the greatest thickness of the table top.

28. The table of claim 9 wherein said table weighs less than twenty pounds.

29. The table of claim 9 wherein the upper surface of said table top includes an elastomeric coating.

30. The table of claim 9, wherein said table with the legs in the first position can support a weight of at least one hundred pounds placed atop the table top without the table exceeding its elastic limit.

31. The table of claim 9 wherein said table top can fit within of a one and a half cubic foot rectangular cuboid.

32. The table of claim 9 wherein all of the characteristic axes of said legs are vertical when in the first position and the table is placed upright on a level floor.

* * * * *